(12) United States Patent
Yamashita et al.

(10) Patent No.: US 9,019,184 B2
(45) Date of Patent: Apr. 28, 2015

(54) LIQUID CRYSTAL DISPLAY DEVICE INCLUDING SPECIFIC SUBPIXEL ARRANGEMENT

(75) Inventors: Yuki Yamashita, Osaka (JP); Akihiro Shohraku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 215 days.

(21) Appl. No.: 13/520,844

(22) PCT Filed: Jan. 4, 2011

(86) PCT No.: PCT/JP2011/050015
§ 371 (c)(1),
(2), (4) Date: Jul. 6, 2012

(87) PCT Pub. No.: WO2011/083784
PCT Pub. Date: Jul. 14, 2011

(65) Prior Publication Data
US 2012/0280896 A1     Nov. 8, 2012

(30) Foreign Application Priority Data

Jan. 8, 2010 (JP) ................................. 2010-003076

(51) Int. Cl.
*G09G 3/36* (2006.01)
*G02F 1/1362* (2006.01)

(52) U.S. Cl.
CPC ............ *G09G 3/3614* (2013.01); *G09G 3/3607* (2013.01); *G02F 1/136213* (2013.01);
(Continued)

(58) Field of Classification Search
CPC .. G09G 3/3607; G09G 3/3648; G09G 3/3611

USPC .................. 345/88, 87, 82, 690, 696
See application file for complete search history.

(56) References Cited

U.S. PATENT DOCUMENTS

| 7,268,757 B2 | 9/2007 | Ben-David et al. |
| 2006/0158454 A1* | 7/2006 | Heynderickx et al. ........ 345/589 |
| 2007/0091043 A1* | 4/2007 | Rho et al. ......................... 345/88 |
| 2007/0268208 A1 | 11/2007 | Okada et al. |
| 2009/0115952 A1 | 5/2009 | Nakamura et al. |

FOREIGN PATENT DOCUMENTS

| JP | 11-295717 A | 10/1999 |
| JP | 2004-529396 A | 9/2004 |

(Continued)

OTHER PUBLICATIONS

Official Communication issued in International Patent Application No. PCT/JP2011/050015, mailed on Apr. 5, 2011.

(Continued)

*Primary Examiner* — Jonathan Blanca
(74) *Attorney, Agent, or Firm* — Keating & Bennett, LLP

(57) ABSTRACT

A liquid crystal display device includes a plurality of subpixels arranged in one column and n rows (where n is an even number ≥ four) within each pixel. In two of the pixels, which are adjacent to each other in the row direction, subpixels that represent the same color belong to the same row. If two of the pixels, which are adjacent to each other in the column direction, are called first and second pixels, respectively, a first half of the subpixels having a combination of first colors are located in odd-numbered rows in the first pixel and in even-numbered rows in the second pixel, while a second half of the subpixels having a combination of second colors, the second colors being different from the first colors, are located in even-numbered rows in the first pixel and in odd-numbered rows in the second pixel.

10 Claims, 14 Drawing Sheets

(52) U.S. Cl.
CPC .......... *G02F2201/52* (2013.01); *G09G 3/3648* (2013.01); *G09G 2300/0452* (2013.01); *G09G 2320/0247* (2013.01)

(56) References Cited

FOREIGN PATENT DOCUMENTS

| | | |
|---|---|---|
| JP | 2008-015070 A | 1/2008 |
| JP | 2009-003002 A | 1/2009 |
| JP | 2009-042404 A | 2/2009 |
| WO | 2007/148519 A1 | 12/2007 |

OTHER PUBLICATIONS

English translation of Official Communication issued in corresponding International Application PCT/JP2011/050015, mailed on Aug. 16, 2012.

* cited by examiner

FIG.17
PRIOR ART
| | | 1000 |
|---|---|---|
| R + | R − | R + |
| G − | G + | G − |
| B + | B − | B + |
| W − | W + | W − |
| R + | R − | R + |
| G − | G + | G − |
| B + | B − | B + |
| W − | W + | W − |
| R + | R − | R + |
| G − | G + | G − |
| B + | B − | B + |
| W − | W + | W − |
FIG.18
PRIOR ART
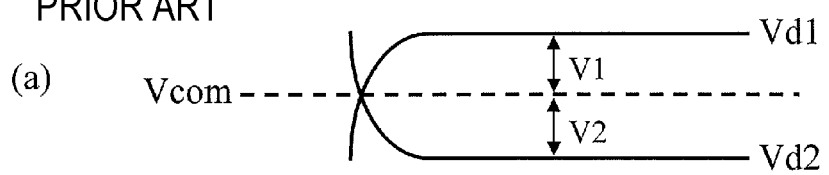
(a)
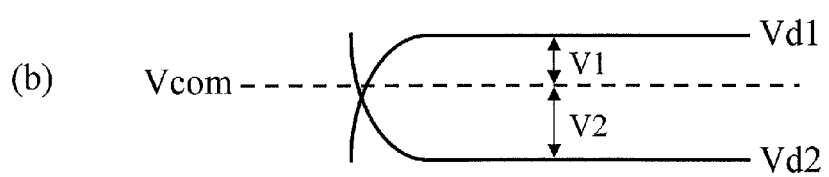
(b)

FIG.19
PRIOR ART

| R + | R − | R + |
|-----|-----|-----|
| G − | G + | G − |
| B + | B − | B + |
| W − | W + | W − |
| R + | R − | R + |
| G − | G + | G − |
| B + | B − | B + |
| W − | W + | W − |
| R + | R − | R + |
| G − | G + | G − |
| B + | B − | B + |
| W − | W + | W − |

1000

LIQUID CRYSTAL DISPLAY DEVICE INCLUDING SPECIFIC SUBPIXEL ARRANGEMENT

TECHNICAL FIELD

The present invention relates to a liquid crystal display device and more particularly relates to a liquid crystal display device, each pixel of which is defined by four or more subpixels.

BACKGROUND ART

Liquid crystal display devices are currently used in a variety of applications. In a general liquid crystal display device, one pixel is comprised of three subpixels respectively representing red, green and blue, which are the three primary colors of light, thereby conducting a display operation in colors.

The general liquid crystal display device, however, can reproduce colors that fall within only a narrow range (which is usually called a "color reproduction range"), which is a problem. Thus, to broaden the color reproduction range of liquid crystal display devices, a technique for increasing the number of primary colors for use to perform a display operation has recently been proposed.

For example, Patent Document No. 1 discloses a liquid crystal display device 800 in which one pixel P is made up of four subpixels that include not only red, green and blue subpixels R, G and B representing the colors red, green and blue, respectively, but also a yellow subpixel Y representing the color yellow as shown in FIG. 13. That liquid crystal display device 800 performs a display operation in colors by mixing together the four primary colors red, green, blue and yellow that are represented by those four subpixels R, G, B and Y.

By performing a display operation using four or more primary colors, the color reproduction range can be broadened compared to the known liquid crystal display device that uses only the three primary colors for display purposes. Such a liquid crystal display device that conducts a display operation using four or more primary colors will be referred to herein as a "multi-primary-color liquid crystal display device". And a liquid crystal display device that conducts a display operation using the three primary colors will be referred to herein as a "three-primary-color liquid crystal display device".

On the other hand, Patent Document No. 2 discloses a liquid crystal display device 900 in which one pixel P is made up of four subpixels that include not only red, green and blue subpixels R, G and B but also a white subpixel W representing the color white as shown in FIG. 14. As the subpixel added is a white subpixel W, that liquid crystal display device 900 cannot broaden the color reproduction range but can still increase the display luminance.

However, if the number of subpixels that form each pixel P is increased from three to four as in the liquid crystal display devices 800 and 900 shown in FIGS. 13 and 14, the number of signal lines to provide also needs to be increased 4/3 times. As pointed out in Patent Document No. 3, such an increase in the number of signal lines to provide would in turn increase the size of the frame area or the number of ICs (which are driver ICs to be arranged on a flexible substrate) for use in a COF (chip on film) mounting process. As a result, either the overall external size or manufacturing cost of the liquid crystal display device would increase.

Thus, to overcome these problems, Patent Document No. 3 discloses a liquid crystal display device 1000 in which subpixels are arranged in a different pattern from in the known ones as shown in FIG. 15. In the liquid crystal display device 1000, each pixel P is defined by red, green, blue and white subpixels R, G, B and W.

In the liquid crystal display devices 800 and 900 shown in FIGS. 13 and 14, the plurality of subpixels that form a single pixel P are arranged in the row direction (i.e., arranged in a row). On the other hand, in the liquid crystal display device 1000, the plurality of subpixels that form a single pixel P are arranged in the column direction (i.e., arranged in a column) as shown in FIG. 15. That is why even though color filters in respective colors are arranged in stripes so as to run in the column direction in the liquid crystal display devices 800 and 900, the color filters in respective colors are arranged in stripes so as to run in the row direction in the liquid crystal display device 1000. In this description, the former color filter arrangement in which color filters run in the column direction will be referred to herein as a "vertical striped arrangement", while the latter color filter arrangement in which color filters run in the row direction will be referred to herein as a "horizontal striped arrangement".

By adopting such a horizontal striped arrangement, the number of signal lines to provide can be reduced significantly compared to a situation where the vertical striped arrangement is adopted. For example, supposing the number of pixels is constant, the number of signal lines to provide for the liquid crystal display device 1000 shown in FIG. 15 can be reduced to a quarter compared to the liquid crystal display devices 800 and 900 shown in FIGS. 13 and 14. If the number of signal lines to provide is reduced significantly, then there is no need to increase the size of the frame area or the number of ICs for use in the COF mounting process. As a result, it is possible to prevent the overall external size or manufacturing cost of a liquid crystal display device from increasing.

CITATION LIST

Patent Literature

Patent Document No. 1: PCT International Application Japanese National Phase Publication No. 2004-529396

Patent Document No. 2: Japanese Laid-Open Patent Publication No. 11-295717

Patent Document No. 3: Japanese Laid-Open Patent Publication No. 2000-3002

SUMMARY OF INVENTION

Technical Problem

However, if the horizontal striped arrangement is adopted as in the liquid crystal display device 1000 shown in FIG. 15, a vertical line flicker will be produced and debase the display quality when a dot inversion drive operation is carried out. The dot inversion drive is a driving method in which the polarity of the voltage applied to the liquid crystal layer is inverted on a subpixel-by-subpixel (i.e., dot-by-dot) basis.

FIG. 16 shows the polarities of voltages applied to respective subpixels when a dot inversion drive operation is carried out on a three-primary-color liquid crystal display device. On the other hand, FIG. 17 shows the polarities of voltages applied to respective subpixels when a dot inversion drive operation is carried out on the liquid crystal display device 1000.

In a three-primary-color liquid crystal display device, the polarities of the voltages applied to subpixels in the same color invert in the row direction as shown in FIG. 16. For example, in the first row of subpixels shown in FIG. 16, the voltages applied to the red subpixels R go positive (+), negative (−) and positive (+) in this order from the left to the right. The voltages applied to the green subpixels G go negative (−), positive (+) and negative (−) in this order. And the voltages applied to the blue subpixels B go positive (+), negative (−) and positive (+) in this order. In addition, in the three-primary-color liquid crystal display device, the polarities of the voltages applied to subpixels in the same color invert in the column direction, too. For example, in the first column of subpixels shown in FIG. 16, the voltages applied to the red subpixels R go positive (+), negative (−) and positive (+) in this order from the top to the bottom.

In the liquid crystal display device 1000, on the other hand, each pixel P is comprised of four subpixels. That is why in each and every column of subpixels, the voltages applied to subpixels in the same color come to have the same polarity everywhere as shown in FIG. 17. For example, in the first column of subpixels shown in FIG. 17, the polarity of the voltage applied to every red subpixel R and every blue subpixel b is positive (+) and that of the voltage applied to every green pixel G and every white subpixel W is negative (−).

If the voltages applied to subpixels in the same color come to have the same polarity anywhere in the column direction in this manner, a vertical line flicker will be generated when something is displayed in a single color. Hereinafter, it will be described with reference to FIGS. 18(a) and 18(b) why such a vertical line flicker is generated.

FIGS. 18(a) and 18(b) show the relation between the voltage Vcom applied to the counter electrode (which will be referred to herein as a "counter voltage") and positive and negative write voltages (drain voltages) Vd1 and Vd2 applied to a pixel electrode.

As shown in FIG. 18(a), the counter voltage Vcom is set to be the intermediate value (center level) between the positive and negative write voltages Vd1 and Vd2. If that is the case, the voltage V1 applied to the liquid crystal layer when the positive write voltage Vd1 is supplied is the same as the voltage V2 applied to the liquid crystal layer when the negative write voltage Vd2 is supplied.

Actually, however, the counter voltage Vcom could be somewhat different from the intermediate value between the positive and negative write voltages Vd1 and Vd2 as shown in FIG. 18(b). In that case, the voltage V1 applied to the liquid crystal layer when the positive write voltage Vd1 is supplied becomes different from the voltage V2 applied to the liquid crystal layer when the negative write voltage Vd2 is supplied. As a result, the luminance of each subpixel varies depending on whether the voltage supplied is the positive write voltage Vd1 or the negative write voltage Vd2.

Consequently, if the color red is displayed with only the red subpixels R lit as shown in FIG. 19, for example, a column of subpixels in which a positive voltage is applied to the red subpixels R and a column of subpixels in which a negative voltage is applied to the red subpixels R come to have mutually different luminances. That is to say, two adjacent columns of subpixels will display vertical lines with two different brightness values. As a result, a vertical line flicker gets sensed, which debases the display quality seriously.

Thus, in order to overcome such problems, the present invention has been made to minimize such degradation in display quality that could be caused when the horizontal striped arrangement is adopted in a liquid crystal display device, of which each pixel is defined by four or more subpixels.

Solution to Problem

A liquid crystal display device according to the present invention has a plurality of pixels that are arranged in columns and rows to form a matrix pattern, and includes: an active-matrix substrate that includes a plurality of scan lines that run in a row direction and a plurality of signal lines that run in a column direction; a counter substrate that faces the active-matrix substrate; and a liquid crystal layer that is interposed between the active-matrix substrate and the counter substrate. Each of the plurality of pixels is defined by a plurality of subpixels that represent mutually different colors. The plurality of subpixels are arranged in one column and n rows (where n is an even number that is equal to or greater than four) within each said pixel. In two arbitrary ones of the pixels, which are adjacent to each other in the row direction, subpixels that represent the same color belong to the same row. If two arbitrary ones of the pixels, which are adjacent to each other in the column direction, are called first and second pixels, respectively, a half of the subpixels are located in odd-numbered rows in the first pixel and in even-numbered rows in the second pixel, while the other half of the subpixels are located in even-numbered rows in the first pixel and in odd-numbered rows in the second pixel.

In one preferred embodiment, the plurality of subpixels is comprised of first, second, third and fourth subpixels that represent first, second, third and fourth colors, respectively, and the first, second, third and fourth subpixels are arranged in one column and four rows within each said pixel.

In one preferred embodiment, the first subpixel is located in the first row in the first pixel and in the second row in the second pixel, respectively. The second subpixel is located in the second row in the first pixel and in the first row in the second pixel, respectively. The third subpixel is located in the third row in the first pixel and in the fourth row in the second pixel, respectively. And the fourth subpixel is located in the fourth row in the first pixel and in the third row in the second pixel, respectively.

In one preferred embodiment, the plurality of subpixels is comprised of red, green, blue, and yellow subpixels that represent the colors red, green, blue, and yellow, respectively.

In one preferred embodiment, the plurality of subpixels is comprised of red, green, blue, and white subpixels that represent the colors red, green, blue, and white, respectively.

In one preferred embodiment, the plurality of subpixels is comprised of first, second, third, fourth, fifth and sixth subpixels that represent first, second, third, fourth, fifth and sixth colors, respectively, and the first, second, third, fourth, fifth and sixth subpixels are arranged in one column and six rows within each said pixel.

In one preferred embodiment, the first subpixel is located in the first row in the first pixel and in the second row in the second pixel, respectively. The second subpixel is located in the second row in the first pixel and in the first row in the second pixel, respectively. The third subpixel is located in the third row in the first pixel and in the fourth row in the second pixel, respectively. The fourth subpixel is located in the fourth row in the first pixel and in the third row in the second pixel, respectively. The fifth subpixel is located in the fifth row in the first pixel and in the sixth row in the second pixel, respectively. And the sixth subpixel is located in the sixth row in the first pixel and in the fifth row in the second pixel, respectively.

In one preferred embodiment, the plurality of subpixels is comprised of red, green, blue, cyan, magenta and yellow subpixels that represent the colors red, green, blue, cyan, magenta and yellow, respectively.

In one preferred embodiment, the device is able to perform dot inversion drive method.

Advantageous Effects of Invention

The present invention can minimize a degradation in display quality that could be caused when the horizontal striped arrangement is adopted in a liquid crystal display device, of which each pixel is defined by four or more subpixels.

BRIEF DESCRIPTION OF DRAWINGS

[FIG. 17] A diagram showing the polarities of voltages applied to respective subpixels when the known liquid crystal display device 1000 is driven by the dot inversion drive method.

[FIG. 18] (a) and (b) show the relation between the voltage Vcom applied to the counter electrode (counter voltage) and positive and negative write voltages (drain voltages) Vd1 and Vd2 applied to a pixel electrode to illustrate why the vertical line flicker generates.

[FIG. 19] A diagram showing a state of the known liquid crystal display device 1000 when a display operation is conducted in a single color (i.e., in red).

DESCRIPTION OF EMBODIMENTS

Hereinafter, embodiments of the present invention will be described with reference to the accompanying drawings. It should be noted, however, that the present invention is in no way limited to the embodiments to be described below.

Figure 1:
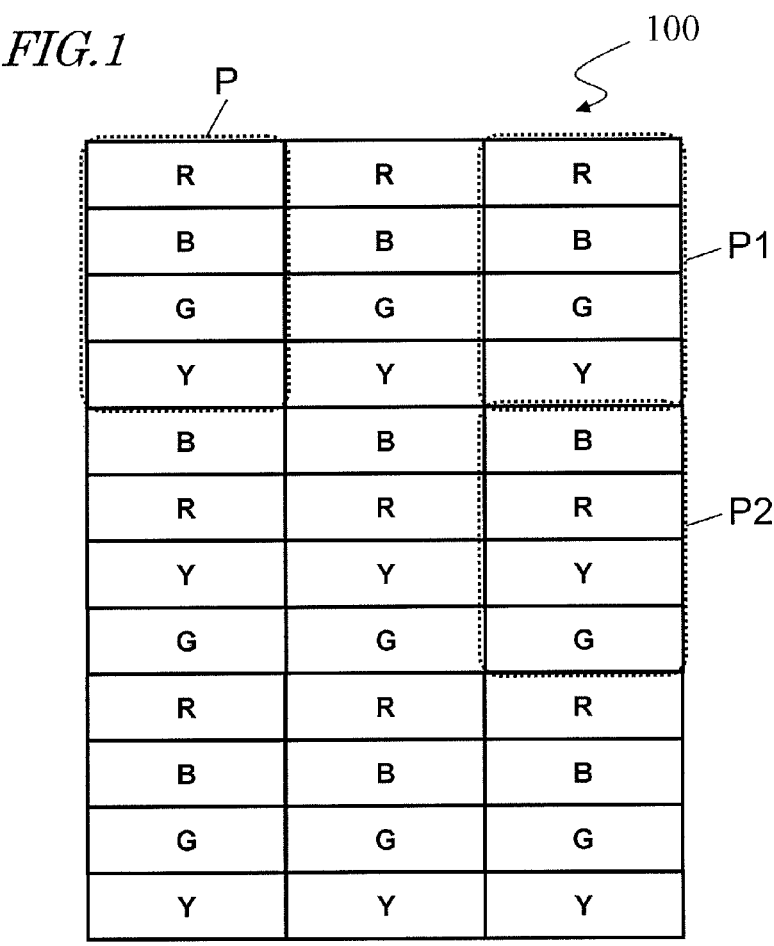
[FIG. 1] A diagram schematically illustrating a liquid crystal display device 100 as a preferred embodiment of the present invention.

FIG. 1 illustrates a liquid crystal display device 100 as an embodiment of the present invention. As shown in FIG. 1, the liquid crystal display device 100 includes a plurality of pixels P that are arranged in columns and rows to form a matrix pattern.

Each of those pixels P is defined by a plurality of subpixels (also called "dots") that represent mutually different colors. Specifically, those subpixels that define each pixel P may be red, green, blue, and yellow subpixels R, G, B and Y representing the colors red, green, blue, and yellow, respectively.

In the liquid crystal display device 100 of this embodiment, the red, green, blue, and yellow subpixels R, G, B and Y are arranged in one column and four rows (i.e., arranged in line in the column direction) within each pixel P.

Figure 2:
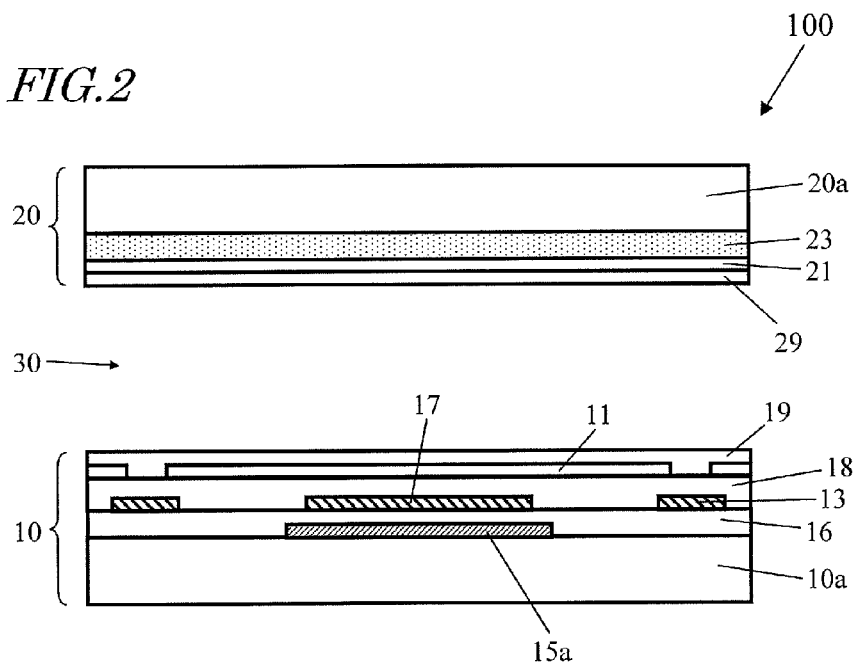
[FIG. 2] A cross-sectional view schematically illustrating a cross section of one subpixel of the liquid crystal display device 100 according to the preferred embodiment of the present invention as viewed in the row direction.
Figure 3:
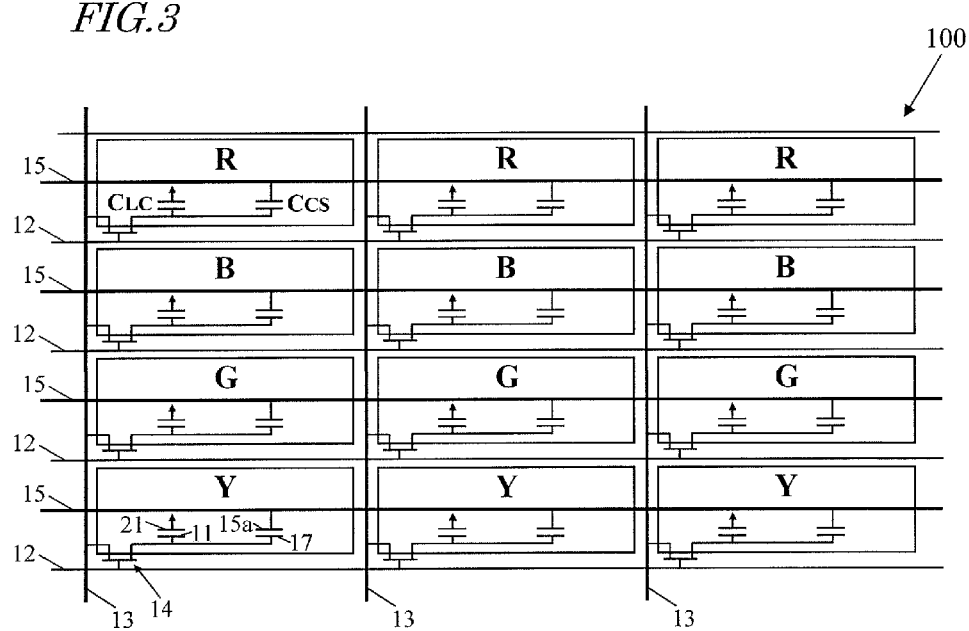
[FIG. 3] An equivalent circuit diagram schematically illustrating twelve subpixels that are arranged in four rows and three columns in the liquid crystal display device 100 according to the preferred embodiment of the present invention.

FIGS. 2 and 3 illustrate a more specific structure for the liquid crystal display device 100. Specifically, FIG. 2 is a cross-sectional view schematically illustrating a cross section of one subpixel of the liquid crystal display device 100 as viewed in the row direction. FIG. 3 is an equivalent circuit diagram illustrating twelve subpixels that are arranged in four rows and three columns (i.e., three consecutive pixels P that are arranged in line in the row direction).

As shown in FIG. 2, the liquid crystal display device 100 includes an active-matrix substrate 10, a counter substrate 20 that faces the active-matrix substrate 10, and a liquid crystal layer 30 that is interposed between the active-matrix substrate 10 and the counter substrate 20.

The active-matrix substrate 10 includes pixel electrodes 11, each of which is provided for an associated one of the subpixels, thin-film transistors (TFTs) 14 that are electrically connected to the pixel electrodes 11, a plurality of scan lines 12 that run in the row direction, and a plurality of signal lines 13 that run in the column direction. Each TFT 14 functioning as a switching element is supplied with not only a scan signal from its associated scan line 12 but also a display signal from its associated signal line 13.

The scan lines 12 are arranged on a transparent substrate (e.g., a glass substrate) 10a with electrically insulating properties. On the transparent substrate 10a, also arranged is a storage capacitor line 15 that runs in the row direction. The storage capacitor line 15 and the scan lines 12 are made of the same conductor film. A portion of the storage capacitor line 15 that is located near the center of each subpixel has a broader width than the rest of the line 15 and functions as a storage capacitor counter electrode 15a. The storage capacitor counter electrode 15a is supplied with a storage capacitor counter voltage (CS voltage) from the storage capacitor line 15.

A gate insulating film 16 is arranged to cover the scan lines 12 and the storage capacitor lines 15 (including the storage capacitor counter electrode 15a). On the gate insulating film 16, arranged are not only the signal lines 13 but also storage capacitor electrodes 17, which are made of the same conductor film as the signal lines 13. Also, each of the storage capacitor electrodes 17 is electrically connected to the drain electrode of its associated TFT 14 and is supplied with the same voltage as its associated pixel electrode 11 via the TFT 14.

An interlayer insulating film 18 is arranged to cover the signal lines 13 and the storage capacitor electrodes 17. The pixel electrodes 11 are located on the interlayer insulating film 18. In the configuration shown in FIG. 2, the pixel electrodes 11 are arranged so that their edges overlap with the scan lines 12 and the signal lines 13 with the interlayer insulating film 18 interposed between them. Naturally, however, the pixel electrodes 11 may also be arranged so that their edges do not overlap with the scan lines 12 or the signal lines 13 at all.

The counter substrate 20 includes a counter electrode 21, which faces the pixel electrodes 11 and which is arranged on a transparent substrate (such as a glass substrate) 20a with electrically insulating properties. The counter substrate 20 further includes a color filter layer 23, which includes red, green, blue, and yellow color filters that transmit red, green, blue, and yellow rays, respectively, and an opaque layer (i.e., a black matrix) that fills the gap between those color filters.

The liquid crystal layer 30 includes liquid crystal molecules (not shown) that have either positive or negative dielectric anisotropy depending on the mode of display, and a chiral agent as needed. Alignment films 19 and 29 are arranged on the uppermost surface (i.e., the surface that is closest to the liquid crystal layer 30) of the active-matrix substrate 10 and counter substrate 20, respectively. Depending on the display mode, the alignment film 19, 29 may be either a horizontal alignment film or a vertical alignment film.

In the liquid crystal display device 100 with such a structure, a liquid crystal capacitor $C_{LC}$ is formed by the pixel electrode 11, the counter electrode 21 that faces the pixel electrode 11, and the liquid crystal layer 30 interposed between them. That is to say, each subpixel includes the pixel electrode 11 provided for the active-matrix substrate 10, the counter electrode 21 that is provided for the counter substrate 20 and that faces the pixel electrode 11, and the liquid crystal layer 30 interposed between the pixel electrode 11 and the counter electrode 21. Also, a storage capacitor $C_{CS}$ is formed by the storage capacitor electrode 17, the storage capacitor counter electrode 15a that faces the storage capacitor electrode 17, and the gate insulating film 16 interposed between them. It should be noted that the storage capacitor $C_{CS}$ does not have to be the illustrated one. For example, if the interlayer insulating film 18 is relatively thin, the storage capacitor electrode 17 may be omitted and the storage capacitor $C_{CS}$ may be formed by the pixel electrode 11, the storage capacitor counter electrode 15a and the gate insulating film 16 and interlayer insulating film 18 that are arranged between them.

As described above, in the liquid crystal display device 100 of this embodiment, the plurality of subpixels defining each pixel P are arranged in one column and four rows within each pixel P. Also, as shown in FIG. 1, any row of subpixels consists of only subpixels in the same color. In other words, in two arbitrary ones of the pixels P, which are adjacent to each other in the row direction, subpixels that represent the same color belong to the same row. Consequently, color filters in respective colors that are included in the color filter layer 23 are arranged in stripes that run in the row direction.

That is to say, this liquid crystal display device 100 adopts a horizontal striped arrangement. By adopting the horizontal striped arrangement, the number of signal lines to provide can be reduced significantly as also disclosed in Patent Document No. 3. Consequently, there is no need to increase the size of the frame area or the number of ICs for use to carry out COF mounting. As a result, an increase in overall external size or manufacturing cost can be minimized.

On top of that, since the liquid crystal display device 100 has the configuration to be described below, generation of vertical line flicker can be suppressed even though the horizontal striped arrangement is adopted.

In the liquid crystal display device 100 of this embodiment, if two arbitrary ones of the plurality of pixels P, which are adjacent to each other in the column direction, are called a "first pixel P1" and a "second pixel P2", respectively, the first and second pixels P1 and P2 have mutually different arrangements of subpixels as shown in FIG. 1. Specifically, in the example illustrated in FIG. 1, the red subpixel R is located in the first row in the first pixel P1 but in the second row in the second pixel P2. The blue subpixel B is located in the second row in the first pixel P1 but in the first row in the second pixel P2. The green subpixel G is located in the third row in the first pixel P1 but in the fourth row in the second pixel P2. And the yellow subpixel Y is located in the fourth row in the first pixel P1 but in the third row in the second pixel P2.

In this manner, a half of the subpixels that define each pixel P are located in odd-numbered rows in the first pixel P1 and in even-numbered rows in the second pixel P2, while the other half of the subpixels are located in even-numbered rows in the first pixel P1 and in odd-numbered rows in the second pixel P2.

Figure 4:
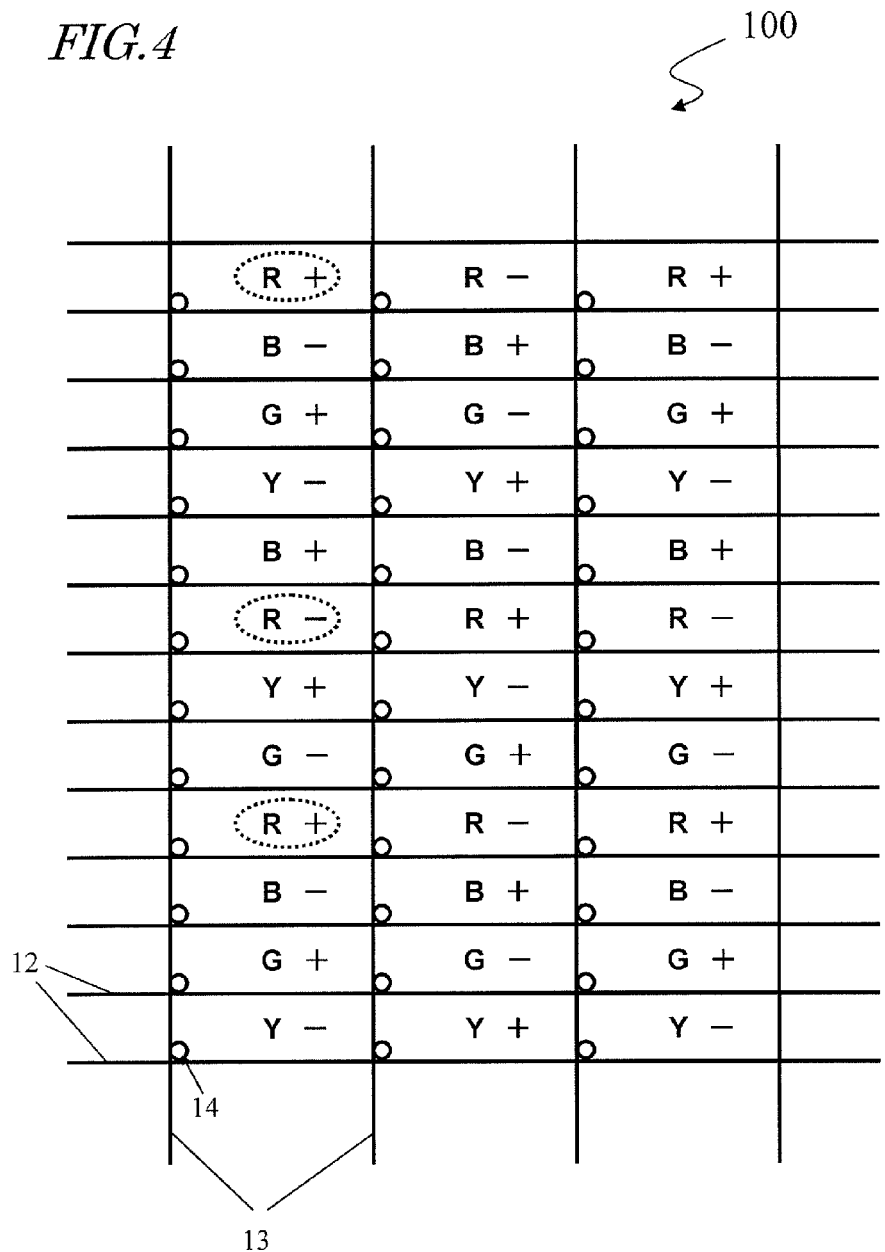
[FIG. 4] A diagram showing the polarities of the voltages applied to the liquid crystal layer of respective subpixels when the liquid crystal display device 100 is driven by dot inversion drive method.

FIG. 4 shows the polarities of the voltages applied to the liquid crystal layer 30 of respective subpixels when the liquid crystal display device 100 is driven by dot inversion drive method. It should be noted that the polarity of the voltage applied to the liquid crystal layer 30 is defined with respect to a reference potential at the counter electrode 21 and is indicated as positive if a positive voltage is applied to the pixel electrode 11 and negative if a negative voltage is applied to the pixel electrode 11.

When the dot inversion drive is carried out, the polarity of the voltage applied to the liquid crystal layer 30 inverts every subpixel both in the row direction and in the column direction as shown in FIG. 4. That is why the polarities of the voltages applied to respective subpixels never agree with each other (i.e., never become the same) in any arbitrary row of subpixels (which consists of subpixels representing the same color). For example, in the first row (i.e., the uppermost row) of subpixels shown in FIG. 4, the voltages applied to the liquid crystal layer 30 of the red subpixels R become positive (+), negative (−), and positive (+) from the left to the right. Likewise, the polarities of the voltages applied to respective subpixels never agree with each other (i.e., never become the same) in any arbitrary column of subpixels, either. For example, in the first column (i.e., the leftmost column) of subpixels shown in FIG. 4, the voltages applied to the liquid crystal layer 30 of the red subpixels R (which are encircled with a dotted ellipse in FIG. 4) become positive (+), negative (−), and positive (+) from top to bottom.

As described above, in the liquid crystal display device 100 of this embodiment, it is possible to avoid applying voltages of the same polarity to multiple subpixels representing the same color not only in the row direction but also in the column direction as well, and therefore, generation of vertical line flicker can be suppressed. Consequently, degradation in display quality due to the generation of vertical line flicker can be reduced significantly.

In the liquid crystal display device 100 shown in FIG. 1, the arrangement of subpixels in the second pixel P2 is obtained by changing not only the positions of two subpixels in the upper two rows of the first pixel P1 with each other and but also those of the other two subpixels in the lower two rows thereof with each other. In other words, the color arrangement is changed every two rows. However, this embodiment is just an example of the present invention and the color arrangement does not always have to be switched every two rows. For example, the arrangement of the liquid crystal display device 100A shown in FIG. 5 may also be adopted.

Figure 5:
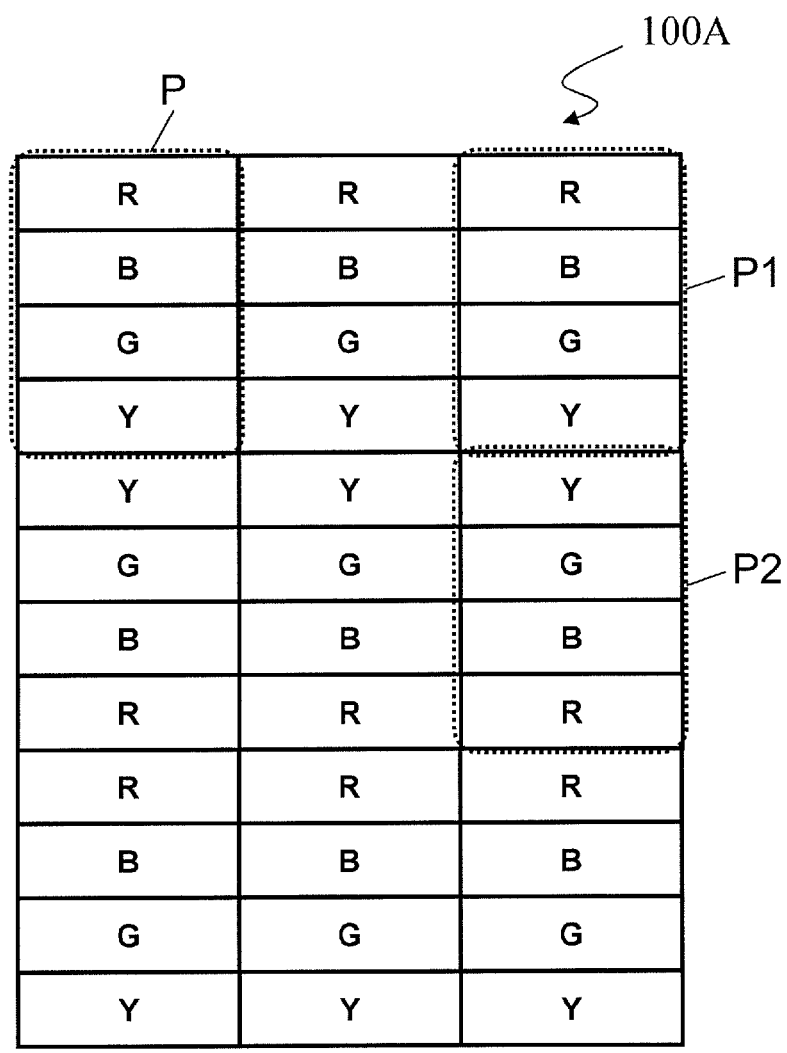
[FIG. 5] A diagram schematically illustrating a liquid crystal display device 100A as a preferred embodiment of the present invention.

As shown in FIG. 5, in the liquid crystal display device 100A, the red subpixel R is located in the first row in the first pixel P1 but in the fourth row in the second pixel P2. The blue subpixel B is located in the second row in the first pixel P1 but in the third row in the second pixel P2. The green subpixel G is located in the third row in the first pixel P1 but in the second row in the second pixel P2. And the yellow subpixel Y is located in the fourth row in the first pixel P1 but in the first row in the second pixel P2.

Figure 6:
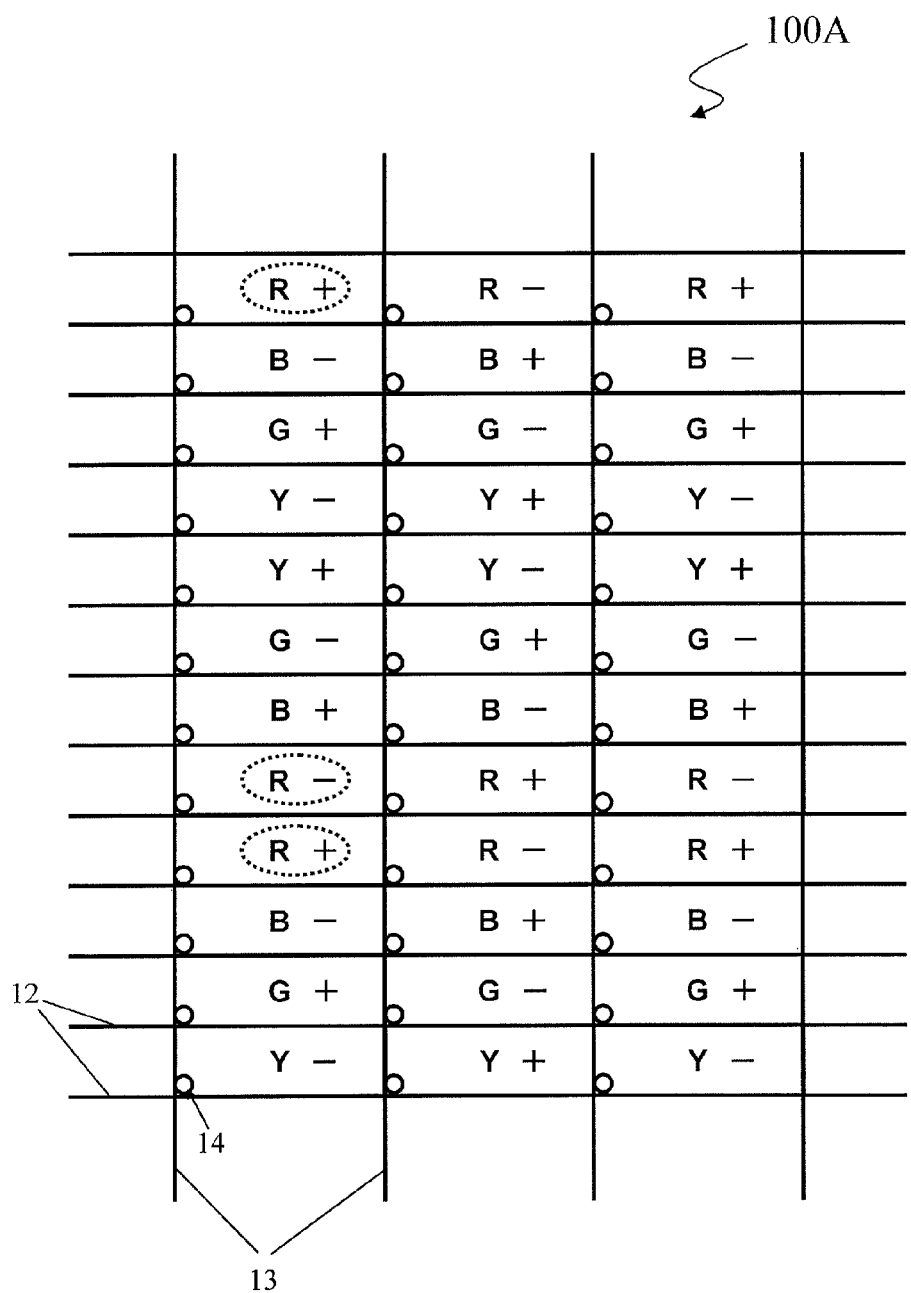
[FIG. 6] A diagram showing the polarities of the voltages applied to the liquid crystal layer of respective subpixels when the liquid crystal display device 100A is driven by dot inversion drive method.

FIG. 6 shows the polarities of the voltages applied to the liquid crystal layer of respective subpixels when the liquid crystal display device 100A is driven by dot inversion drive method. As shown in FIG. 6, the polarities of the voltages applied to respective subpixels never agree with each other in any arbitrary row of subpixels. For example, in the first row of subpixels shown in FIG. 6, the voltages applied to the liquid crystal layer of the red subpixels R become positive (+), negative (−), and positive (+) from the left to the right. Likewise, the polarities of the voltages applied to respective subpixels never agree with each other in any arbitrary column of subpixels, either. For example, in the first column of subpixels shown in FIG. 6, the voltages applied to the liquid crystal layer of the red subpixels R (which are encircled with a dotted ellipse in FIG. 6) become positive (+), negative (−), and positive (+) from top to bottom.

As described above, in this liquid crystal display device 100A, it is also possible to avoid applying voltages of the same polarity to multiple subpixels representing the same color not only in the row direction but also in the column direction as well, and therefore, generation of vertical line flicker can be suppressed. Consequently, degradation in display quality due to the generation of vertical line flicker can be reduced significantly. Such an effect can be achieved because a half of the subpixels that define each pixel P are located in odd-numbered rows in the first pixel P1 and in even-numbered rows in the second pixel P2, while the other half of the subpixels are located in even-numbered rows in the first pixel P1 and in odd-numbered rows in the second pixel P2.

In the embodiment in which the color arrangement is switched every two rows as in the liquid crystal display device 100 shown in FIG. 1, the magnitude of positional shift between the two subpixels representing the same color in the first and second pixels P1 and P2 is relatively small (i.e., just one row for any color). As a result, the display operation is hardly affected by such a shift, which is advantageous.

Figure 7:
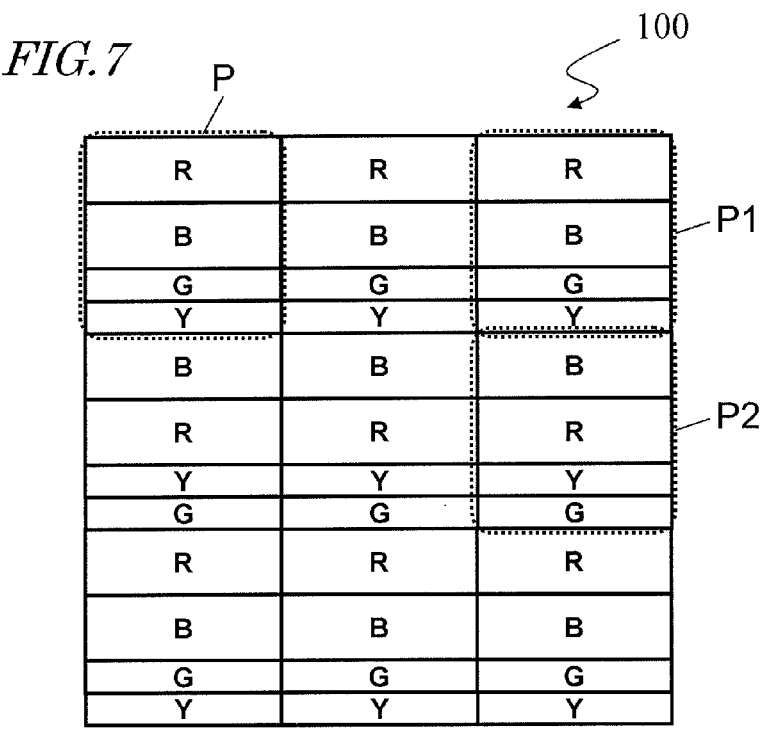
[FIG. 7] A diagram schematically illustrating the liquid crystal display device 100 according to the preferred embodiment of the present invention.
Figure 8:
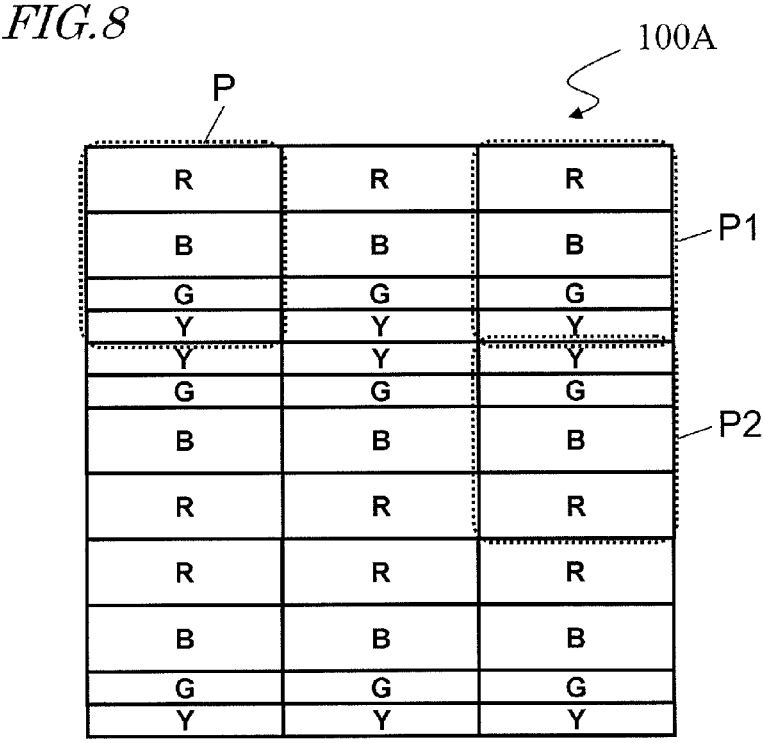
[FIG. 8] A diagram schematically illustrating a liquid crystal display device 100A as another preferred embodiment of the present invention.

FIGS. 1 and 5 illustrate a situation where the red, green, blue, and yellow subpixels R, G, B and Y all have the same size. However, this is just an example of the present invention. Optionally, the plurality of subpixels that defines each pixel P may include some subpixels that have a different size from the others. For example, the red and blue subpixels R and B may be larger than the green and yellow subpixels G and Y as shown in FIGS. 7 and 8. If the red subpixel R is larger than the yellow subpixel Y, a brighter color red (i.e., a color red with higher lightness) can be displayed than in a situation where every subpixel has the same size as disclosed in PCT International Application Publication No. 2007/148519.

As for the respective kinds (i.e., the combination) of subpixels that define a single pixel P, the combination described above is just an example, too. For example, each pixel P may be defined by either red, green, blue subpixels R, G, and B and a cyan subpixel representing the color cyan or red, green, and blue subpixels R, G, and B and a magenta subpixel representing the color magenta.

Figure 9:
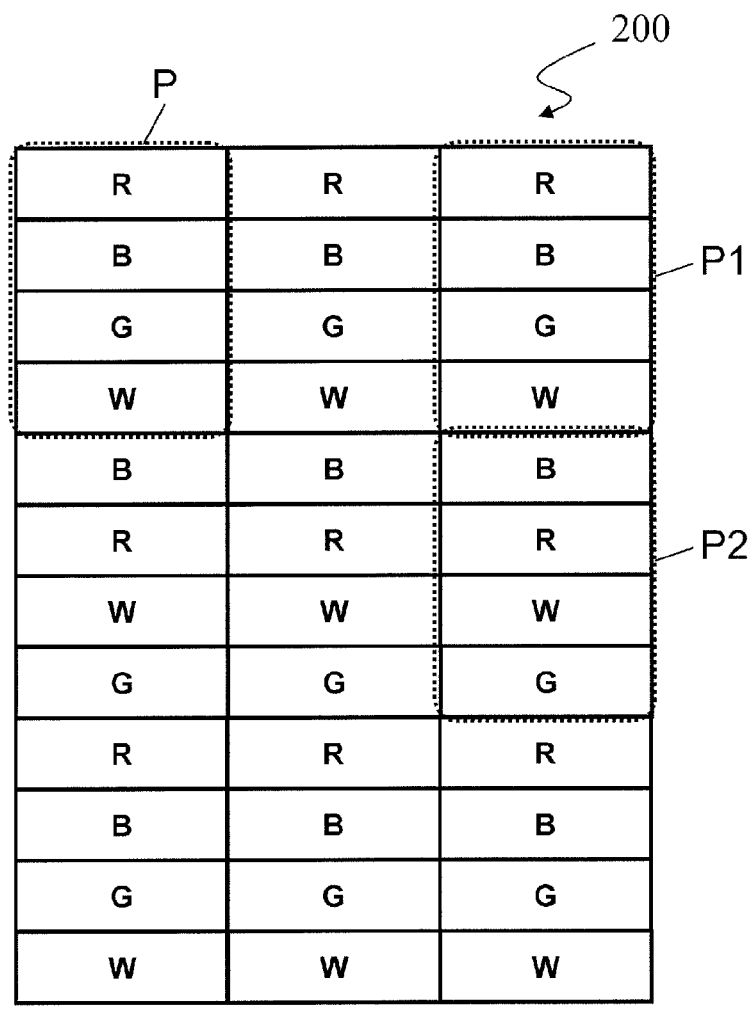
[FIG. 9] A diagram schematically illustrating a liquid crystal display device 200 as another preferred embodiment of the present invention.

Alternatively, each pixel P may also be defined by red, green, blue and white subpixels R, G, B and W as in the liquid crystal display device 200 shown in FIG. 9. The liquid crystal display device 200 is obtained by replacing the yellow subpixels Y with white subpixels W in the liquid crystal display device 100. A colorless and transparent color filter (i.e., a color filter that transmits white light) is arranged in a region of the color filter layer of the counter substrate that is allocated to the white subpixel W in the liquid crystal display device 200. In the liquid crystal display device 200, the color reproduction range cannot be broadened because the primary color added is the color white, but the overall display luminance of a single pixel P can be increased.

Figure 10:
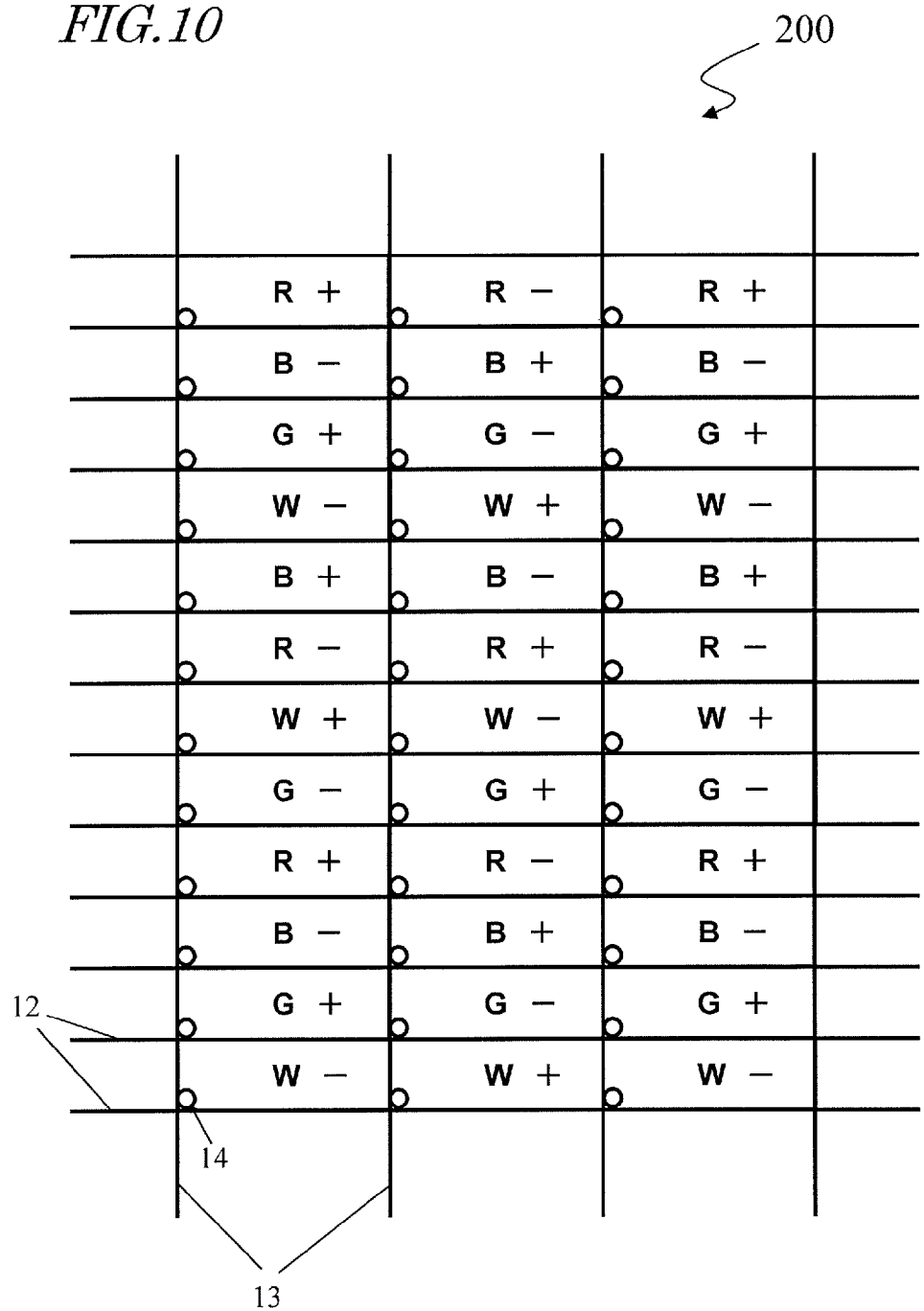
[FIG. 10] A diagram showing the polarities of the voltages applied to the liquid crystal layer of respective subpixels when the liquid crystal display device 200 is driven by dot inversion drive method.

In this liquid crystal display device 200, a half of the subpixels that define each pixel P are also located in odd-numbered rows in the first pixel P1 and in even-numbered rows in the second pixel P2, while the other half of the subpixels are located in even-numbered rows in the first pixel P1 and in odd-numbered rows in the second pixel P2. Thus, when the dot inversion drive is carried out, it is possible to avoid applying voltages of the same polarity to multiple subpixels representing the same color not only in the row direction but also in the column direction as well as shown in FIG. 10, and therefore, generation of vertical line flicker can be suppressed. Consequently, degradation in display quality due to the generation of vertical line flicker can be reduced significantly.

It should be noted that the plurality of subpixels that defines each pixel P does not have to be four subpixels that are arranged in one column and four rows as shown in FIGS. 1, 5 and 9. Rather, the present invention is broadly applicable to any liquid crystal display device, each pixel P of which is defined by a plurality of subpixels that are arranged in one column and n rows (where n is an even number that is equal to or greater than four) in that pixel P.

Figure 11:
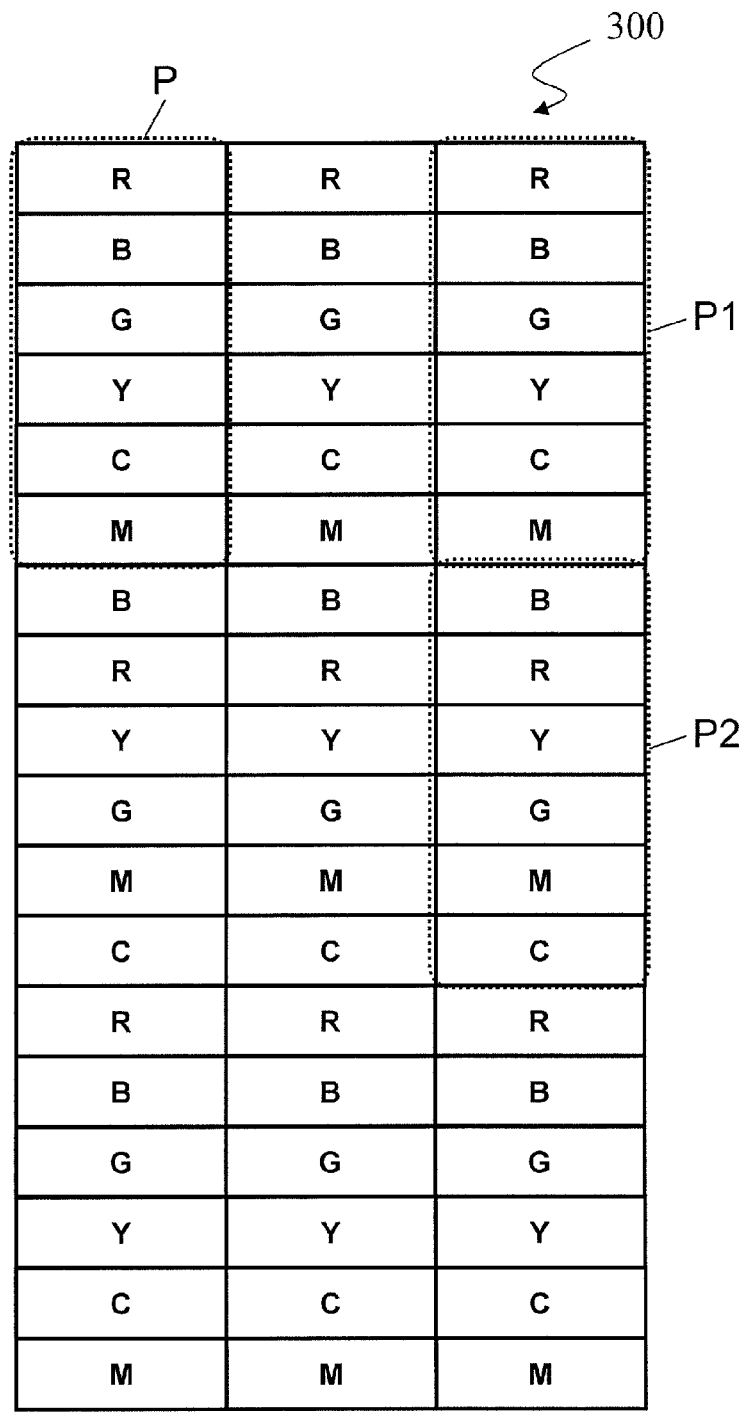
[FIG. 11] A diagram schematically illustrating a liquid crystal display device 300 as another preferred embodiment of the present invention.

For example, as in the liquid crystal display device 300 shown in FIG. 11, each pixel P may also be defined by six subpixels that are arranged in one column and six rows. In the liquid crystal display device 300, each pixel P is defined by six subpixels that are comprised of not only the red, green, blue, and yellow subpixels R, G, B and Y but also cyan and magenta subpixels C and M representing the colors cyan and magenta as well.

In the liquid crystal display device 300, if two arbitrary ones of the plurality of pixels P, which are adjacent to each other in the column direction, are called a "first pixel P1" and a "second pixel P2", respectively, the first and second pixels P1 and P2 have mutually different arrangements of subpixels as shown in FIG. 11.

Specifically, in the example illustrated in FIG. 11, the red subpixel R is located in the first row in the first pixel P1 but in the second row in the second pixel P2. The blue subpixel B is located in the second row in the first pixel P1 but in the first row in the second pixel P2. The green subpixel G is located in the third row in the first pixel P1 but in the fourth row in the second pixel P2. The yellow subpixel Y is located in the fourth row in the first pixel P1 but in the third row in the second pixel P2. The cyan subpixel C is located in the fifth row in the first pixel P1 but in the sixth row in the second pixel P2. And the magenta subpixel M is located in the sixth row in the first pixel P1 but in the fifth row in the second pixel P2.

In this manner, a half of the subpixels that define each pixel P are located in odd-numbered rows in the first pixel P1 and in even-numbered rows in the second pixel P2, while the other half of the subpixels are located in even-numbered rows in the first pixel P1 and in odd-numbered rows in the second pixel P2.

Figure 12:
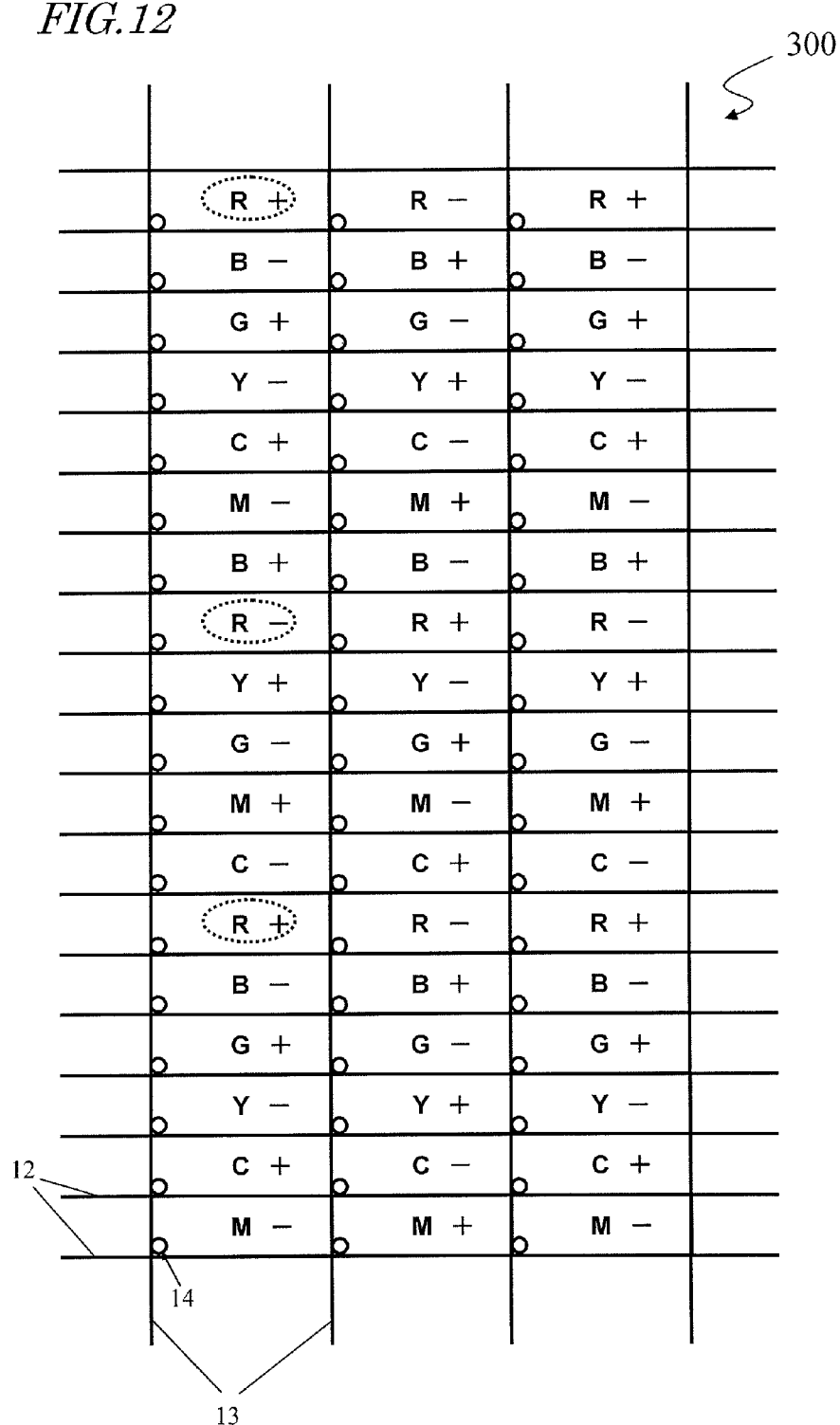
[FIG. 12] A diagram showing the polarities of the voltages applied to the liquid crystal layer of respective subpixels when the liquid crystal display device 300 is driven by dot inversion drive method.
Figure 13:
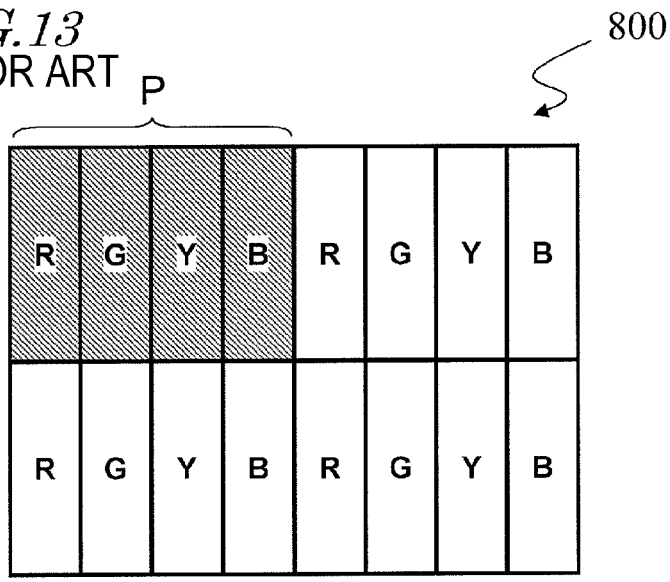
[FIG. 13] A diagram schematically illustrating a known liquid crystal display device 800.
Figure 14:
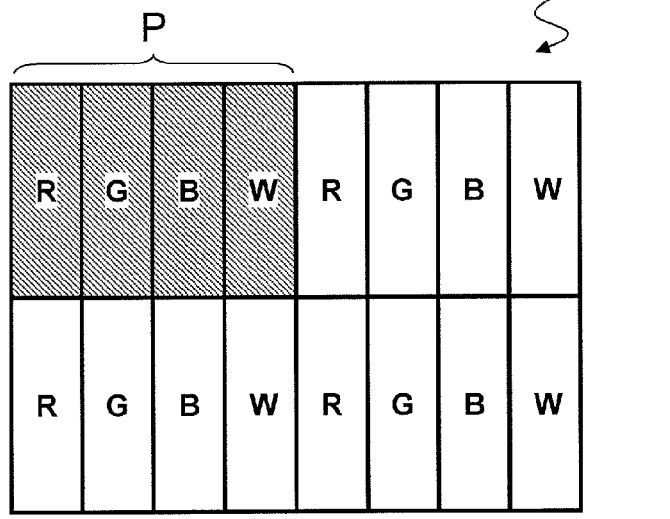
[FIG. 14] A diagram schematically illustrating another known liquid crystal display device 900.
Figures 15, 16:
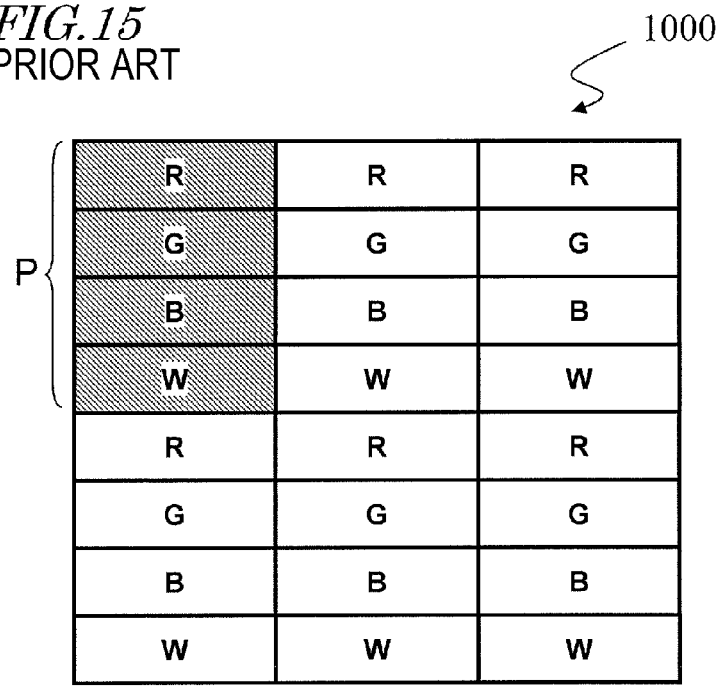
[FIG. 15] A diagram schematically illustrating another known liquid crystal display device 1000.
[FIG. 16] A diagram showing the polarities of voltages applied to respective subpixels when a three-primary-color liquid crystal display device is driven by the dot inversion drive method.

FIG. 12 shows the polarities of the voltages applied to the liquid crystal layer of respective subpixels when the liquid crystal display device 300 is driven by dot inversion drive method. As shown in FIG. 12, the polarities of the voltages applied to respective subpixels never agree with each other (i.e., never become the same) in any arbitrary row of subpixels (which consists of subpixels representing the same color). For example, in the first row of subpixels shown in FIG. 12, the voltages applied to the liquid crystal layer of the red subpixels R become positive (+), negative (−), and positive (+) from the left to the right. Likewise, the polarities of the voltages applied to respective subpixels never agree with each other (i.e., never become the same) in any arbitrary column of subpixels, either. For example, in the first column of subpixels shown in FIG. 12, the voltages applied to the liquid crystal layer of the red subpixels R (which are encircled with a dotted ellipse in FIG. 12) become positive (+), negative (−), and positive (+) from top to bottom.

As described above, in the liquid crystal display device 300, it is possible to avoid applying voltages of the same polarity to multiple subpixels representing the same color not only in the row direction but also in the column direction as well, and therefore, generation of vertical line flicker can be suppressed. Consequently, degradation in display quality due to the generation of vertical line flicker can be reduced significantly.

In the liquid crystal display device 300, the arrangement of subpixels in the second pixel P2 is obtained by changing not only the positions of two subpixels in the upper two rows of the first pixel P1 with each other and but also those of another two subpixels in the middle two rows thereof with each other and those of the other two subpixels in the lower two rows thereof with each other. In other words, the color arrangement is changed every two rows. That is why the magnitude of positional shift between the two subpixels representing the same color in the first and second pixels P1 and P2 is relatively small (i.e., just one row for any color). As a result, in this liquid crystal display device 300, the display operation is no more affected by such a shift as in the liquid crystal display device 100 shown in FIG. 1, which is advantageous. Naturally, as in the situation where each pixel P is defined by four subpixels, even if each pixel P is defined by six subpixels, the color arrangement does not always have to be switched every two rows.

INDUSTRIAL APPLICABILITY

The present invention can minimize degradation in display quality due to vertical line flicker that could be caused when the horizontal striped arrangement is adopted in a liquid crystal display device, of which each pixel is defined by four or more subpixels. The present invention can be used effectively in a multi-primary-color liquid crystal display device that conducts a display operation in four or more primary colors.

REFERENCE SIGNS LIST 10 active-matrix substrate
10a, 20a transparent substrate
11 pixel electrode
12 scan line
13 signal line
14 thin-film transistor (TFT)
15 storage capacitor line
15a storage capacitor counter electrode
16 gate insulating film
17 storage capacitor electrode
18 interlayer insulating film
19, 29 alignment film
20 counter substrate
21 counter electrode
23 color filter layer
30 liquid crystal layer
100, 100A, 200, 300 liquid crystal display device
P pixel
P1 first pixel
P2 second pixel
R red subpixel
G green subpixel
B blue subpixel
Y yellow subpixel
W white subpixel
C cyan subpixel
M magenta subpixel

The invention claimed is:

1. A liquid crystal display device comprising:
a plurality of pixels that are arranged in columns and rows to form a matrix pattern;
an active-matrix substrate that includes a plurality of scan lines that run in a row direction and a plurality of signal lines that run in a column direction;
a counter substrate that faces the active-matrix substrate; and
a liquid crystal layer that is interposed between the active-matrix substrate and the counter substrate, wherein
each of the plurality of pixels is defined by a plurality of subpixels that represent mutually different colors,
the plurality of subpixels are arranged in one column and n rows (where n is an even number that is equal to or greater than four) within each of the plurality of pixels,
in two arbitrary ones of the plurality of pixels which are directly adjacent to each other in the row direction, subpixels that represent same colors are positioned in same numbered rows in both of the two arbitrary ones of the plurality of pixels which are directly adjacent to each other in the row direction,
in another two arbitrary ones of the plurality of pixels which are directly adjacent to each other in the column direction are a first pixel and a second pixel, respectively, and
a first half of the subpixels having a combination of first colors are located in odd-numbered rows in the first pixel and in even-numbered rows in the second pixel, and a second half of the subpixels having a combination of second colors different from the first colors, are located in even-numbered rows in the first pixel and in odd-numbered rows in the second pixel.

2. The liquid crystal display device of claim 1, wherein
the plurality of subpixels include first, second, third, and fourth subpixels that represent first, second, third, and fourth colors, respectively, and
the first, second, third, and fourth subpixels are arranged in one column and four rows within each said pixel.

3. The liquid crystal display device of claim 2, wherein
the first subpixel is located in the first row in the first pixel and in the second row in the second pixel, respectively,
the second subpixel is located in the second row in the first pixel and in the first row in the second pixel, respectively, the third subpixel is located in the third row in the first pixel and in the fourth row in the second pixel, respectively, and the fourth subpixel is located in the fourth row in the first pixel and in the third row in the second pixel, respectively.

4. The liquid crystal display device of claim 2, wherein the plurality of subpixels is comprised of red, green, blue, and yellow subpixels that represent the colors red, green, blue, and yellow, respectively.

5. The liquid crystal display device of claim 2, wherein the plurality of subpixels is comprised of red, green, blue, and white subpixels that represent the colors red, green, blue, and white, respectively.

6. The liquid crystal display device of claim 1, wherein
the plurality of subpixels is comprised of first, second, third, fourth, fifth, and sixth subpixels that represent first, second, third, fourth, fifth, and sixth colors, respectively, and the first, second, third, fourth, fifth, and sixth subpixels are arranged in one column and six rows within each said pixel.

7. The liquid crystal display device of claim 6, wherein
the first subpixel is located in the first row in the first pixel and in the second row in the second pixel, respectively, the second subpixel is located in the second row in the first pixel and in the first row in the second pixel, respectively, the third subpixel is located in the third row in the first pixel and in the fourth row in the second pixel, respectively, the fourth subpixel is located in the fourth row in the first pixel and in the third row in the second pixel, respectively, the fifth subpixel is located in the fifth row in the first pixel and in the sixth row in the second pixel, respectively, and the sixth subpixel is located in the sixth row in the first pixel and in the fifth row in the second pixel, respectively.

8. The liquid crystal display device of claim 6, wherein the plurality of subpixels is comprised of red, green, blue, cyan, magenta and yellow subpixels that represent the colors red, green, blue, cyan, magenta and yellow, respectively.

9. The liquid crystal display device of claim 1, wherein the device is configured to perform dot inversion driving.

10. The liquid crystal display device of claim 1, wherein
each of the plurality of subpixels includes a switching transistor and a pixel electrode electrically connected to a drain electrode of the switching transistor, and a gate electrode of the switching transistor is electrically connected to a corresponding one of the plurality of scan lines, and a source electrode of the switching transistor is electrically connected to a corresponding one of the plurality of signal lines.

* * * * *